Dec. 11, 1928.  
H. L. WALKER  
FILTER PRESS  
Filed Aug. 28, 1926
1,694,956
3 Sheets-Sheet 1
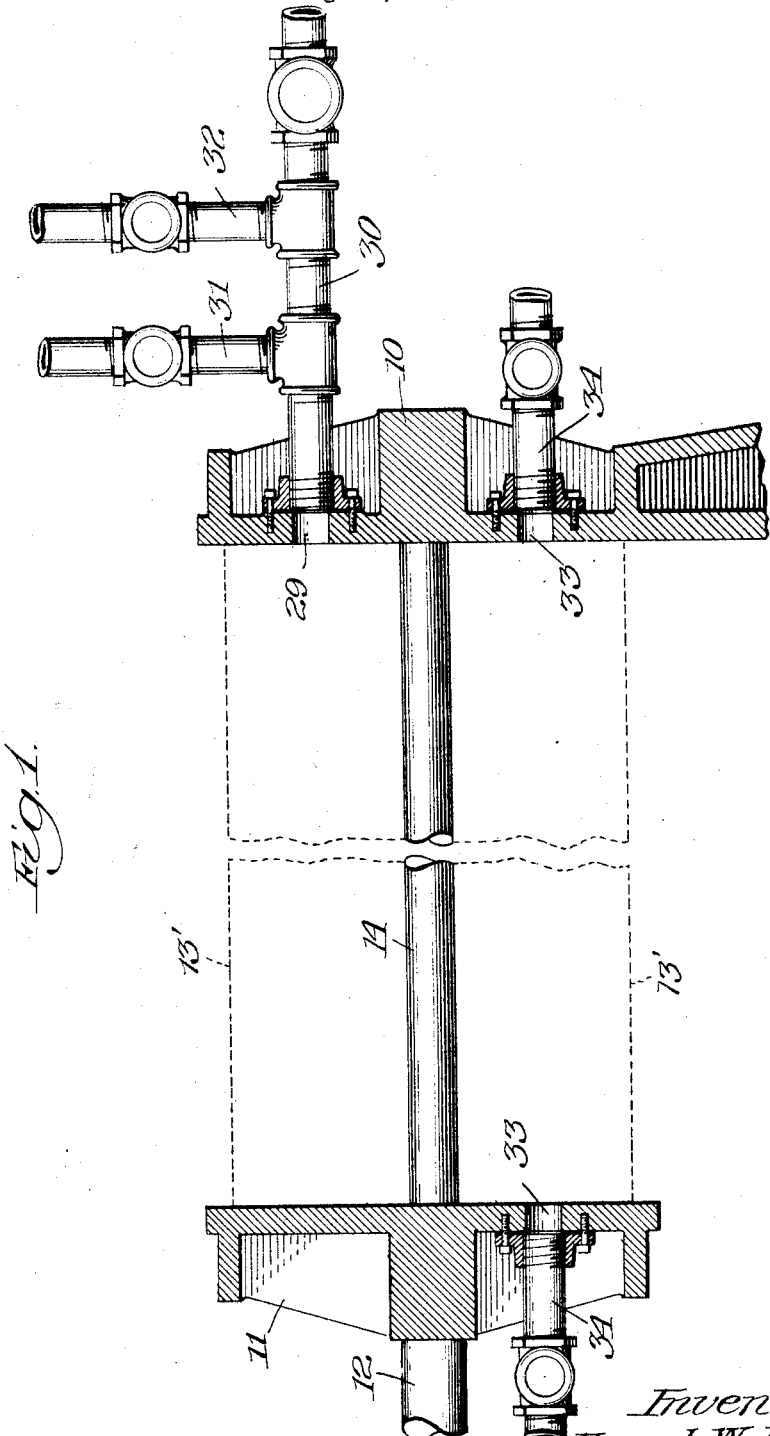

Dec. 11, 1928.
H. L. WALKER
FILTER PRESS
Filed Aug. 28, 1926
1,694,956
3 Sheets-Sheet 2
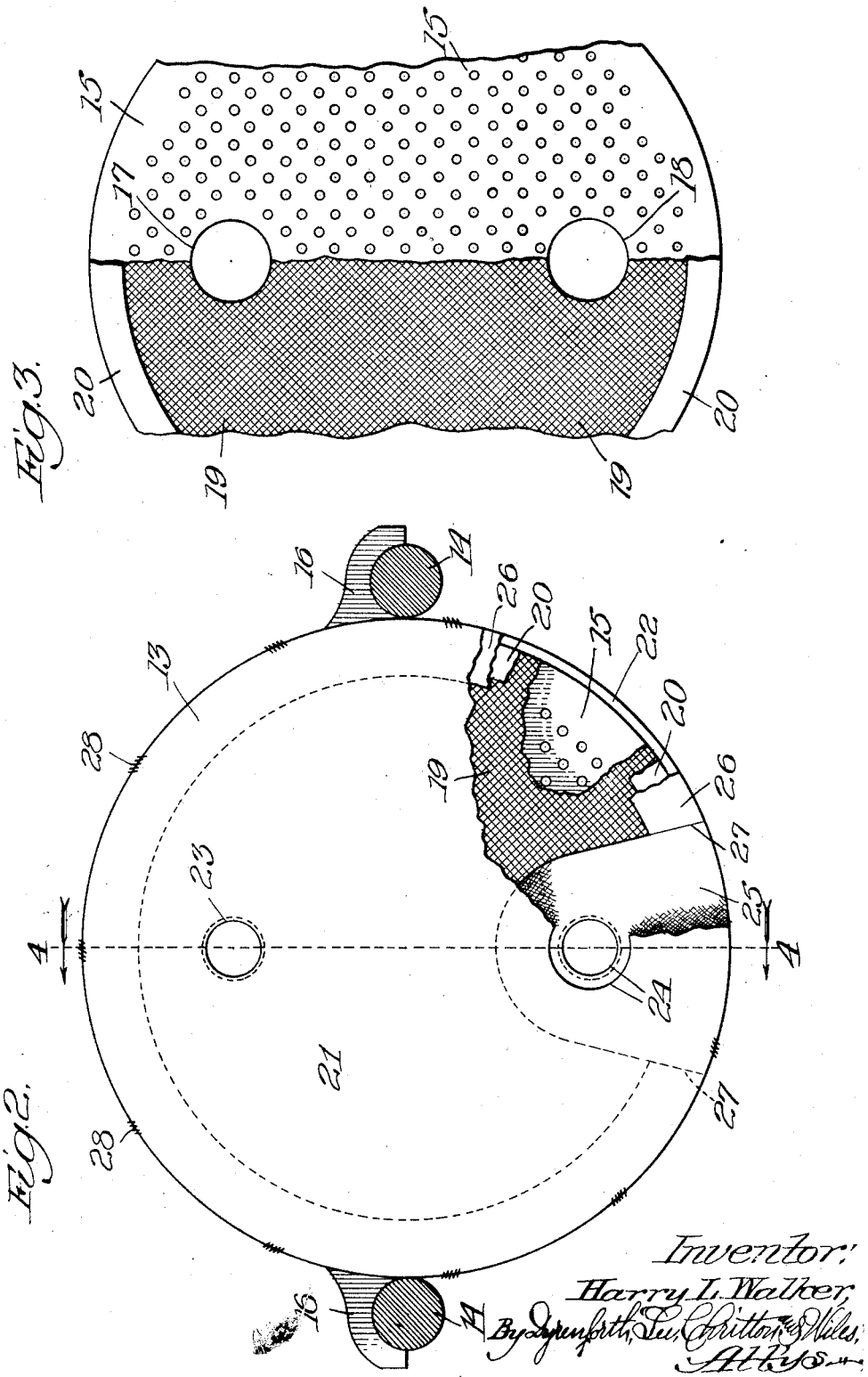

Dec. 11, 1928.  
H. L. WALKER  
FILTER PRESS  
Filed Aug. 28, 1926  
1,694,956  
3 Sheets-Sheet 3
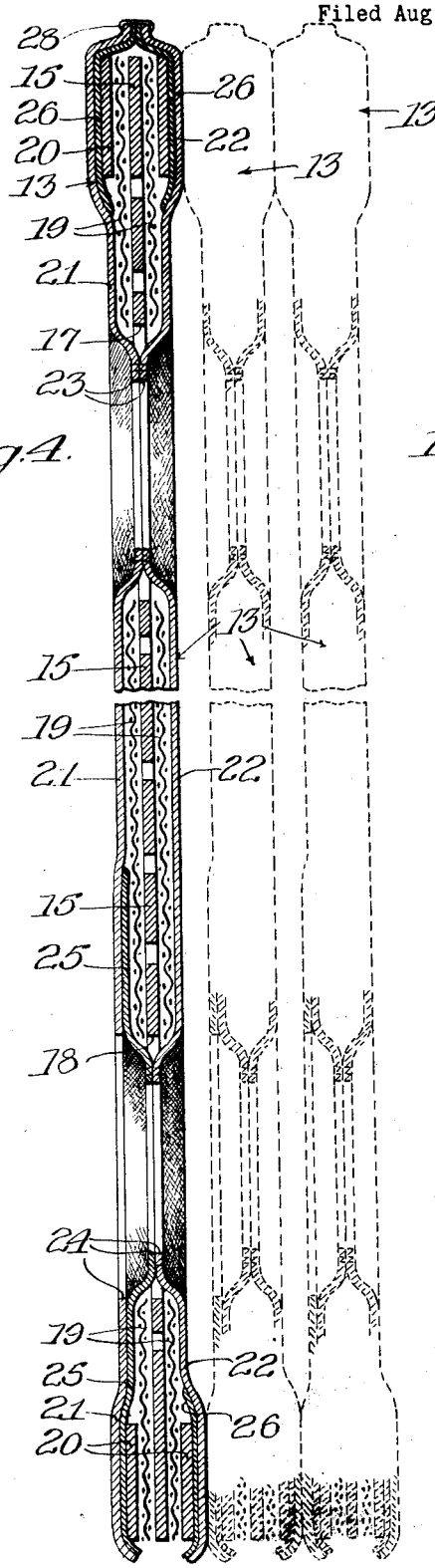
Fig. 4.
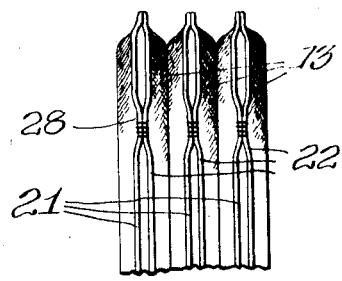
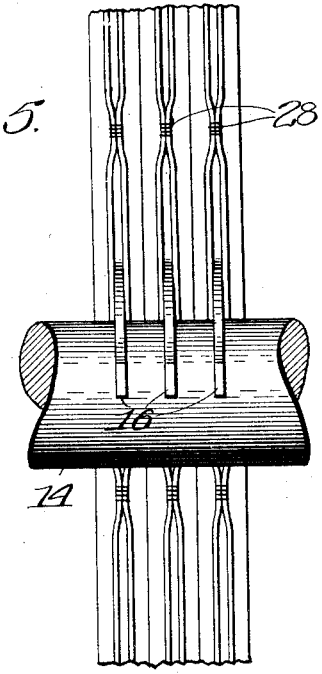
Fig. 5.
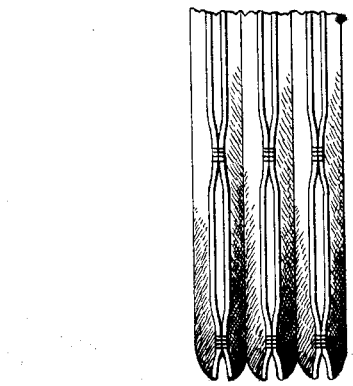
Inventor:  
Harry L. Walker, Patented Dec. 11, 1928.

1,694,956

UNITED STATES PATENT OFFICE.

HARRY L. WALKER, OF WHITING, INDIANA, ASSIGNOR TO STANDARD OIL COMPANY, OF WHITING, INDIANA, A CORPORATION OF INDIANA.

FILTER PRESS.

Application filed August 28, 1926. Serial No. 132,215.

The present invention relates to improvements in filter-presses and particularly to improvements in filter members therefor. The improved filter-press is primarily adapted for the filtration of paraffin wax from chilled oil but may be used for the separation of other solids from liquids.

The invention will be understood from the following description of its application to the filter-press described and claimed in Bransky's U. S. patent application, Serial No. 132,255 filed August 28, 1926, and illustrated by the accompanying drawings, in which Figure 1 is a longitudinal sectional view of a filter press, details of the filter members or plates being omitted.

Fig. 2 is an elevation of a filter member, partly broken away to show its construction.

Fig. 3 is a broken detail in elevation of a filter member, the filter cloths being removed and other parts broken away to show the construction.

Fig. 4 is a transverse sectional view of a filter member, the assembled relationship between adjacent filter members being shown by the filter members in dotted lines, and Fig. 5 is a detail view in elevation of an intermediate portion of the filter press.

Referring to the drawings, 10 indicates the stationary head of a filter press, which may be mounted upon a suitable support, and 11 the movable head, which may be forced in the direction of the stationary head 10 by means of the plunger 12, actuated by hydraulic or other suitable means. The arrangement of these parts may be that customary in filter presses and is not herein described in detail. Between the heads of the press the filter members 13, hereinafter described, are slidably mounted upon rails 14, 14, occupying the space between the lines 13'—13' on Fig. 1.

The construction of these filter members 13 which are circular in form, is clearly shown in Figs. 2, 3 and 4. In each filter member there is a central supporting disk 15, (preferably perforated), provided at substantially diametrically opposite points with outwardly extending arms 16, 16 adapted to ride upon rails 14, 14. Plate 15 is provided with an opening 17 located above its center and preferably more than half the radius of the plate above that point and also with an opening 18 below the center and adjacent its lower edge. On each side of plate 15 is mounted a disk 19 of woven wire or suitably perforate material, these disks being of substantially the same area as the plate 15, and being provided with openings aligning with those in plate 15. Rings 20 securely fastened on each side of the filter members at its circumference serve to hold its parts together and form thickened rims for the filter member itself. Filter cloths or blankets 21, 22, are applied on each side of the filter member, the filter cloths being provided with openings 23, and 24 aligning with, but somewhat smaller than the openings 17 and 18 of plates 15. The filter cloths 21, 22 on each side of a filter member are suitably united through the openings 17 and 18 so as to prevent passage of liquid to the interior of the filter member except through the filter cloth. The filter cloths 21, 22 on both sides of each filter member 13 are sewed tightly together around their opening 23, within the opening 17 in each filter member as shown in Figs. 2 and 4. At the opening 18, a bib or piece of filter cloth 25, provided with a corresponding opening 24, and preferably of the shape shown in Fig. 2, is located adjacent the woven wire 19, on one side of the member 13 and is sewed tightly to the filter cloth 22 on the other side of the filter member, within the opening 18 in the plate 15. As shown in Figs. 2 and 4, the bib 25 extends downwardly to the circumference of the filter member 13 and for a substantial distance from the opening 18 in all directions to provide ample bearing surface to contact with the cloth 21. The cloth 21 is superimposed upon the bib 25 and is provided with a gasket 26 of the same thickness as the bib, partly around its circumference, on its inner side, the ends of this gasket contacting with the sides of the bib 25 at 27 to make a tight joint. The cloth 21 is not sewed or otherwise secured to the bib 25, the liquid under pressure serving to hold the cloth 21 and the bib 25 tightly together, thereby preventing escape of unfiltered liquid therebetween. It is preferred to assemble the cloths 21 and 22 and the bib 25, by sewing the cloths 21 and 22 together about their openings 23, and sewing the bib 25 and the cloth 22 together about their openings 24, before applying them to the filter members. The filter cloths 21, 22 can readily be applied to the members 13, by folding the cloth 21 and passing it through the opening 17 to the opposite side of the filter member from the cloths 22, folding the bib 25 and passing it through the opening 18 to the same side as the cloth 21, unfolding the bib 25 and spreading it over the filter member and unfolding the cloth 21 and spreading it over the filter-member and the bib 25. When the cloths are thus applied to the filter member, they may be held in position by stitching them together at intervals around their circumferences as shown in 28, 28. A plurality of filter members of the character described are mounted between the heads of the press in the space between the lines 13'—13' of Fig. 1, and in normal operation are held tightly together by the pressure applied to movable head 11.

The stationary head 10 is provided with an opening 29 extending into its inner face and preferably in alignment with the openings 23 in the filter members 13. To the opening 29 is connected a valved pipe 30 which connects with valved branch pipes 31 and 32. The heads 10 and 11 are provided with openings 33 preferably in alignment with the openings 24 of the filter members 13 and the openings are provided with valved draw-off pipes 34.

In operation, the press being considered to have been previously chilled, chilled oil containing paraffin wax is forced into the press under pressure through pipe 30, the entire press being held under pressure by plunger 12. The oil spreads through the press by the openings 23 and 24, filling the spaces between the filter members, which spaces are usually called the wax spaces, and filters through the filter cloths 21 and 22. The pressure of the oil holds the cloth 21 tightly against the bib 25 preventing escape of unfiltered oil therebetween. The filtered oil drains from the press through the spaces provided by the insertion of the woven wire disks 19 between the rings 20 and plates 15 of the filter members. The wax deposits upon the filter cloths 21 and 22 and gradually fills up the wax spaces. When the latter are filled to the desired extent, as indicated by the pressure required to continue the flow of oil, the introduction of chilled oil is stopped.

In order to effect the removal of the wax, water at a suitable temperature (for example, above 180° F. and preferably about 200° F.) is introduced by pipe 31 and passes to the various wax spaces by openings 23, thereby melting the wax, which passes through the filter cloths and out of the press, where it is separately collected for further treatment after separation of water by settling.

After the removal of the wax, the valve of pipe 31 is closed, leaving the press full of hot water. The valves of the draw-off pipes 34 are now opened and the hot water allowed to flow off. The openings 24 in the filter members being located near the lower edges thereof permit the water to pass from one wax space to the next until the press is substantially completely drained. The press is now chilled by introducing chilled fluid medium thereinto, and withdrawing the same either by draining through the pipe 34 or by forcing the medium out through the filter cloths. The cooling medium ordinarily employed is chilled pressed oil. If wax-containing oil is used, it must be again chilled and pressed. In some cases the press may be partially chilled with cold water introduced by pipe 32, before chilling with oil, the ease and rapidity with which the press can be drained rendering such method of cooling desirable.

The improved method of ensuring combination of the filter cloths at the opening 18, may be applied to both openings 17 and 18 or any greater number of openings; or it may be applied to filter members having a single hole therethrough.

While the present invention has been described as applied to the filter-press and filter members described and claimed in Bransky's patent application, Serial No. 132,255 filed August 28, 1926, it is to be understood that it is not limited thereto, since it is capable of numerous modifications within the terms of the appended claims.

I claim:

1. The method of applying filter cloths to a filter member having an opening therethrough, which consists in forming corresponding openings in the filter cloths and a bib, securing the bib to one cloth about the opening therein, locating the bib and latter filter cloth on opposite sides of the filter member, and arranging the second filter cloth on the filter member and bib, so that the bib has unsecured contact with the second filter cloth on a substantial surface around the opening therein.

2. The method of applying filter cloths to a filtering member having a pair of openings therethrough, which consists in forming openings in a pair of filter cloths corresponding to the openings in said member, securing the filter cloths together about one pair of corresponding openings therein forming an opening in a bib and securing said bib to one of said filter cloths about the opening in the bib and the unsecured opening of said filter cloth, locating said bib and latter filter cloth on opposite sides of the filter member, and arranging the other filter cloth on the filter member and bib so that the bib has unsecured contact with said filter cloth on a substantial surface around the opening therein.

3. The method of maintaining an operative connection between overlapping portions of filtering cloths, consisting in subjecting the portions to pressure applied by the action of material being filtered.

4. The method consisting in arranging filtering cloths on opposite sides of supporting means, and in arranging connecting means for the cloths through an opening of the supporting means into unsecured contact with the adjacent cloth, and in subjecting the cloths at the zone of said unsecured contact to the pressure of the material being filtered.

5. The method consisting in arranging filtered cloths on opposite sides of supporting means and in supporting the cloths at open connected portions in an opening of said supporting means, in arranging additional connecting means for the cloths through another opening of the supporting means into unsecured contact with the adjacent cloth, and in subjecting the cloths at the zone of said unsecured contact to the pressure of the material being filtered.

6. The method of applying filter cloths to a filter member having a pair of openings therethrough, which consists in forming openings in a pair of filter cloths corresponding to the openings in said member, securing the filter cloths together about one pair of corresponding openings therein, forming an opening in a bib and securing said bib to one of said filter cloths about the opening in the bib and the unsecured opening of said filter cloth, passing the bib through an opening in the filter member so as to locate it on the opposite side of the filter member from the cloth to which it is attached, passing the other filter cloth through the other opening in the filtering member and arranging it over the member and the bib, so that the bib contacts therewith on a substantial surface around the opening therein.

7. A filter member for wax filtration apparatus comprising a body portion, said body portion being provided with means for permitting flow of liquid to the periphery thereof, said body portion being provided with an opening therethrough, a filter cloth on one side of the body portion, a bib and a filter cloth on the other side of the body portion, said cloths and bib being provided with openings corresponding to the opening in the body portion, and means for securing the bib and the cloth on the opposite side of the body portion therefrom together about their openings through the opening in the body portion.

8. A filter member for wax filtration apparatus comprising a body portion, said body portion being provided with means for permitting flow of liquid to the periphery thereof, said body portion being provided with a plurality of openings therethrough, a filter cloth on one side of the body portion, a bib and a filter cloth on the other side of the body portion, said cloths being provided with openings corresponding to the openings in the body portion, and said bib being provided with an opening corresponding to one of said openings in the body portion, means for securing the bib and the cloth on the opposite side of the body portion together through said opening in the body portion, and means for securing the filter cloths together through the other openings in the body portion about their corresponding openings.

9. In a filter member of the type described, a filter cloth on one side, a bib and filter cloth on the other side, said member, cloths and bib being provided with aligned openings, and means for securing together the bib and the filter cloth on the opposite side of the member about their openings through the opening in the member, said bib making contact with the cloth on the same side of the member on a substantial surface around the opening therein.

10. In a filter member of the type described, a filter cloth on one side, a bib and filter cloth on the other side, said members and cloths being provided with a pair of aligned openings therethrough and said bib being provided with an opening aligning with one set of openings, means for securing together the bib and the cloth on the opposite side of the member about their aligned openings through the corresponding opening in the member, said bib making contact with the cloth on the same side of the member on a substantial surface around the aligned openings therein, and means for securing the other pair of openings in the cloths together through the corresponding opening in the filter member.

11. A filter structure comprising cloths having openings therethrough and connected about the openings, a bib extending from one of the cloths unconnected to the other cloth and arranged to contact with the other cloth, said bib and cloths having substantially aligned openings therethrough.

12. A filter structure having cloths providing two openings through the structure, said cloths being connected together about one of the openings, and a bib extending from one cloth at the other opening unconnected to and adapted to contact with the coacting cloth.

HARRY L. WALKER.